US012093203B2

(12) United States Patent
Lewis et al.

(10) Patent No.: US 12,093,203 B2
(45) Date of Patent: Sep. 17, 2024

(54) SYSTEM AND METHOD FOR SUPPORTING COMMUNICATIONS BETWEEN MANAGEMENT CONTROLLERS AND DEVICES

(71) Applicant: Dell Products L.P., Round Rock, TX (US)

(72) Inventors: Jonathan Foster Lewis, Round Rock, TX (US); Florence Gilberte Dorsey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 17/956,717

(22) Filed: Sep. 29, 2022

(65) Prior Publication Data

US 2024/0111705 A1    Apr. 4, 2024

(51) Int. Cl.
*G06F 13/40* (2006.01)
*G06F 8/65* (2018.01)

(52) U.S. Cl.
CPC ............ *G06F 13/4068* (2013.01); *G06F 8/65* (2013.01); *G06F 13/4022* (2013.01); *G06F 13/4031* (2013.01)

(58) Field of Classification Search
None
See application file for complete search history.

(56) References Cited

U.S. PATENT DOCUMENTS

| 7,072,349 B2* | 7/2006 | DeHart | H04L 49/351 370/231 |
| 7,280,591 B2* | 10/2007 | Sung | H04L 12/40136 375/220 |
| 11,757,612 B2* | 9/2023 | Heinrich | H04L 7/0037 |
| 11,822,499 B1* | 11/2023 | Lee | G06F 13/4282 |

OTHER PUBLICATIONS

"Network Controller Sideband Interface (NC-SI) Specification", DMTF, DSP0222, Sep. 1, 2022, 239 pages.

* cited by examiner

*Primary Examiner* — Farley Abad
*Assistant Examiner* — Dayton Lewis-Taylor
(74) *Attorney, Agent, or Firm* — Womble Bond Dickinson (US) LLP

(57) ABSTRACT

Methods and systems for managing the operation of data processing systems are disclosed. To manage the operation of data processing systems, a management controller hosted by a data processing system may communicate with other components of the data processing system via sideband communications. To facilitate sideband communications between the management controller and other devices, the data processing system may include a sideband communication system. The sideband communication system may facilitate sideband communications between devices over large distances and/or under conditions that may otherwise render the sideband communications infeasible.

20 Claims, 7 Drawing Sheets

SYSTEM AND METHOD FOR SUPPORTING COMMUNICATIONS BETWEEN MANAGEMENT CONTROLLERS AND DEVICES

FIELD

Embodiments disclosed herein relate generally to device management. More particularly, embodiments disclosed herein relate to communications between management devices and other devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
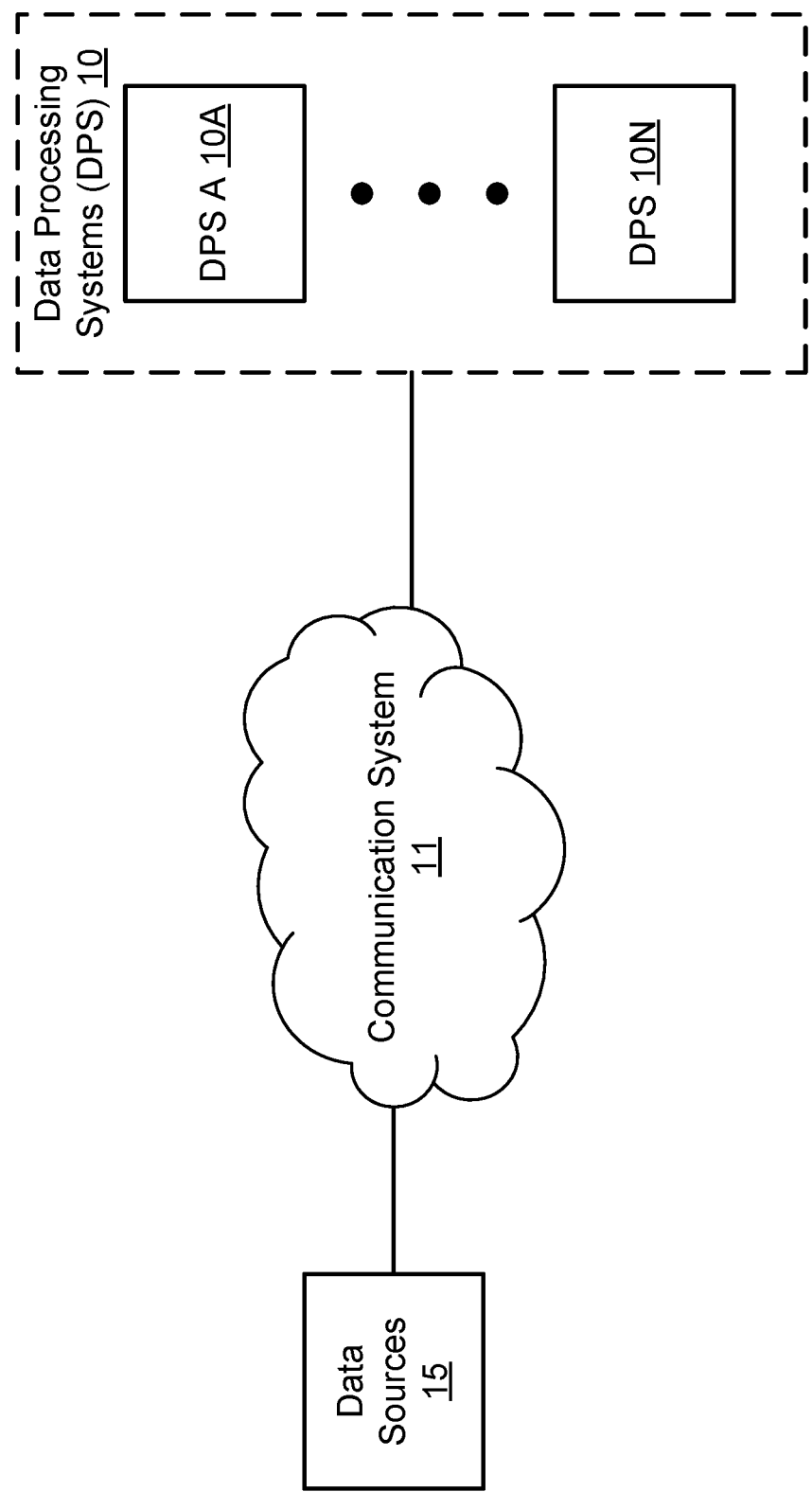
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing the operation of data processing systems. To manage the operation of data processing systems, a management controller hosted by a data processing system may communicate with other components of the data processing system via sideband communications.

To facilitate sideband communications between the management controller and other devices, the data processing system may include a sideband communication system. The sideband communication system may facilitate sideband communications over large distances and/or under conditions that may otherwise render specification compliant sideband communications infeasible.

To facilitate sideband communications over large distances and/or under conditions that would otherwise render specification compliant sideband communications infeasible, the communication system may include (i) subsystems that facilitate point-to-point communications that lack tri-state interface functionality and (ii) subsystems that provide tri-state interface functionality for the other subsystems. The subsystems that provide tri-state interface functionality may manage the state (e.g., high impedance, bridging, etc.) of the tri-state interfaces based on management signals (e.g., control) implemented by the subsystems that facilitate point-to-point communications. By doing so, embodiments disclosed herein may provide a data processing system that supports sideband communications over large distances and for multiple devices (e.g., a shared sideband bus).

Thus, embodiments disclosed herein may provide an improved sideband communication system that may facilitate communications between devices with more flexibility in the positions of the devices. Accordingly, the disclosed embodiments may provide for new data processing system hardware geometries that may otherwise not be implemented.

In an embodiment, a data processing system is provided. The data processing system may include a management controller adapted to communicate with network interface controllers via sideband communications through a tri-state enabled interface; a first network interface controller of the network interface controllers; a second network interface controller of the network interface controllers; a reduced media interface based transport to carry the sideband communications to the first network interface controller or the second network interface controller across an extended channel that exceeds distance limits associated with the sideband communications, the reduced media interface based transport lacking tri-state interface functionality; and a channel manager adapted to communicate with the reduced media interface based transport and present the tri-state interface to the management controller.

The channel manager may include a bus switch; an OR gate (e.g., logical OR gate) positioned to: receive a control signal and a transmit enable signal from the reduced media interface based transport; when at least one of the control signal and the transmit enable signal are a high signal, output a high signal to the bus switch; and when the control signal and the transmit enable signal are a low signal, output a low signal to the bus switch. The bus switch may be adapted to, while the high signal from the OR gate is output, transmit data received via the reduced media interface to the management controller. The bus switch may also be adapted to, while the low signal from the OR gate is output, present a high impedance on electrical lines interconnecting the bus switch and to the management controller, the high impedance providing electrical isolation while the bus switch is not transmitting to the management controller.

The channel manager may include a second bus switch, and output of the bus switch and the second bus switch may both electrically connected to the management controller to support the sideband communications.

The data processing system may also include an arbitration bus operably connected to the first network interface controller and the second network interface controller. The first network interface controller and the second network interface controller may be adapted to communicate via the arbitration bus to limit communication (e.g., to one device at a time) over the reduced media interface based transport to one network interface controller at a time. The channel manager may be unable to access the communications via the arbitration bus to identify which of the network interface controllers has authority to communicate via the reduced media interface based transport.

The management controller may provide out of band management functionality for computing resources of the data processing system. The management controller may also be adapted to leverage the network interface controllers to communicate with a remote control plane tasked with managing the computing resources of the data processing system.

The management controller may be further adapted to obtain updates for operation of the data processing system via the sideband communication with the network interface controllers, and deploy the updates to the computing resources. Deploying the updates may include installing an operating system in the computing resources. The operating system may be adapted to manage operation of the data processing system. The management controller may operate independently from the operating system.

The management controller may be adapted to report telemetry information regarding the computing resources to the remote control plane via the sideband communications. At least one of the network interface controllers may be a data processing unit (e.g., a network interface controller with computing resources such that the data processing unit may perform various functionalities include, for example, device emulation, presentation of remote resources as local devices, and/or other types of functionalities).

The reduced media interface based transport may be shared by the first network interface controller and the second network interface controller using a protocol that is unable to compensate for a length of the extended channel. For example, signal timing required by the protocol may be unable to be implemented for the length of the extended channel.

In an embodiment, a communication system is provided. The communication system may include a first network interface controller, a second network interface controller, a reduced media interface based transport, and a channel manager as discussed above.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 10. Data processing systems 10 may provide the computer implemented services to users of data processing systems 10 and/or to other devices (not shown). Different data processing systems (e.g., 10A, 10N) may provide similar or different computer implemented services.

To manage the operation of data processing systems 10, each of data processing systems 10 may include one or more management controllers which may operate independently from the host data processing system. The management controllers may control various aspects of the operation of the host data processing system.

When managing the operation of the host data processing system, the management controller may obtain copies of data from remote devices such as data sources 15. The obtained data may include, for example, images of various software to be hosted by the host data processing system, configurations for the host data processing system, and/or any other types of data usable to manage the operation of the host data processing system. In this manner, a remote entity may direct and manage the operation of the host data processing system (e.g., by providing instructions to the management controller which may act based on the instructions).

To obtain data from data sources 15, communicate with other devices (not shown), and/or perform other functions, the management controllers may use communication functionality provided by the host data processing system. For example, the management controller may communicate with a network interface controller of the host data processing system to communicate with other devices.

In general, embodiments disclosed herein may provide methods, systems, and/or devices for management of data processing systems by enabling communications between management controllers of host data processing systems and other devices of the host data processing systems. To enable communications between management controllers of host data processing system and other components (e.g., network interface controllers, data processing units, and/or other types of devices), embodiments disclosed herein may provide a data processing system that includes an internal communication channel for sideband communication between the management controllers and other components of the host data processing system that includes tri-state functionality even over distances that would otherwise not be supported natively by the management controller, various components of the internal communication channel, and/or other devices. By doing so, embodiments disclosed herein may facilitate communications in compliance with sideband communication standards (e.g., network controller sideband interface (NC-SI) bus) over distances that exceed the specifications of the communication standards.

To do so, embodiments disclosed herein may provide a communication channel that may operates in accordance with a non-sideband communication compliant standard (e.g., reduced media independent interface (RMII)) and provides tri-state functionality for endpoints of the communication channel to place the resulting communication channel in compliance with sideband communication standards (e.g., the NC-SI specification). By doing so, embodiments disclosed herein may reduce the likelihood of communication channel contention from occurring by ensuring that dormant portions of the communication channel provide a high impedance interface state (e.g., thereby electrically isolating them) while allowing active portions of the communication channel to direct signals to desired targets (e.g., without being impacted by the electrically isolated portions of the circuits). Thus, a data processing system in accordance with an embodiment may be capable of providing sideband communications between management controllers and other devices (e.g., network interface controllers) using a single, shared communication channel that extends over distances that would otherwise not be supported natively by sideband communication specifications.

Figure 2A:
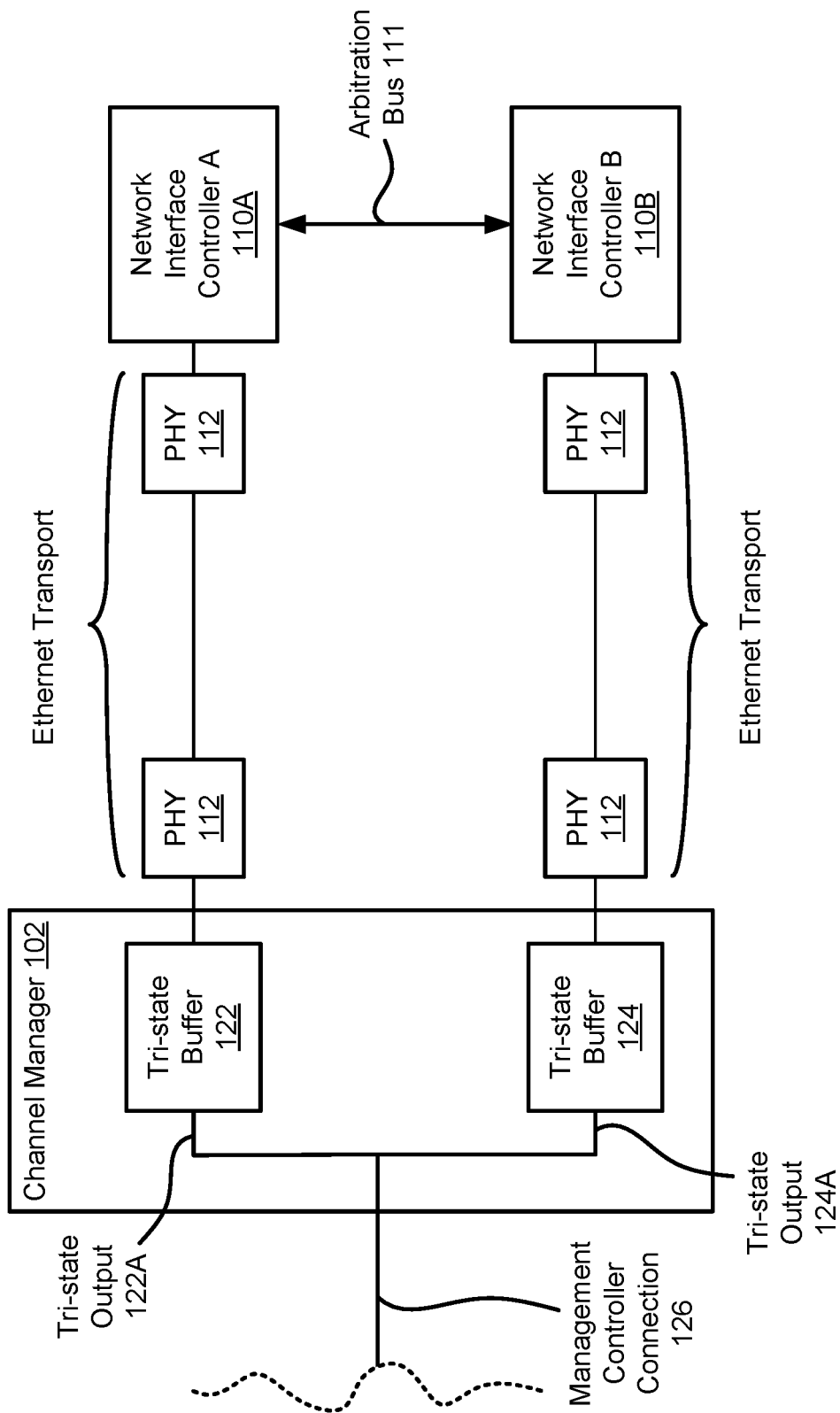
FIG. 2A shows a block diagram illustrating a sideband communication system in accordance with an embodiment.
Figure 2B:
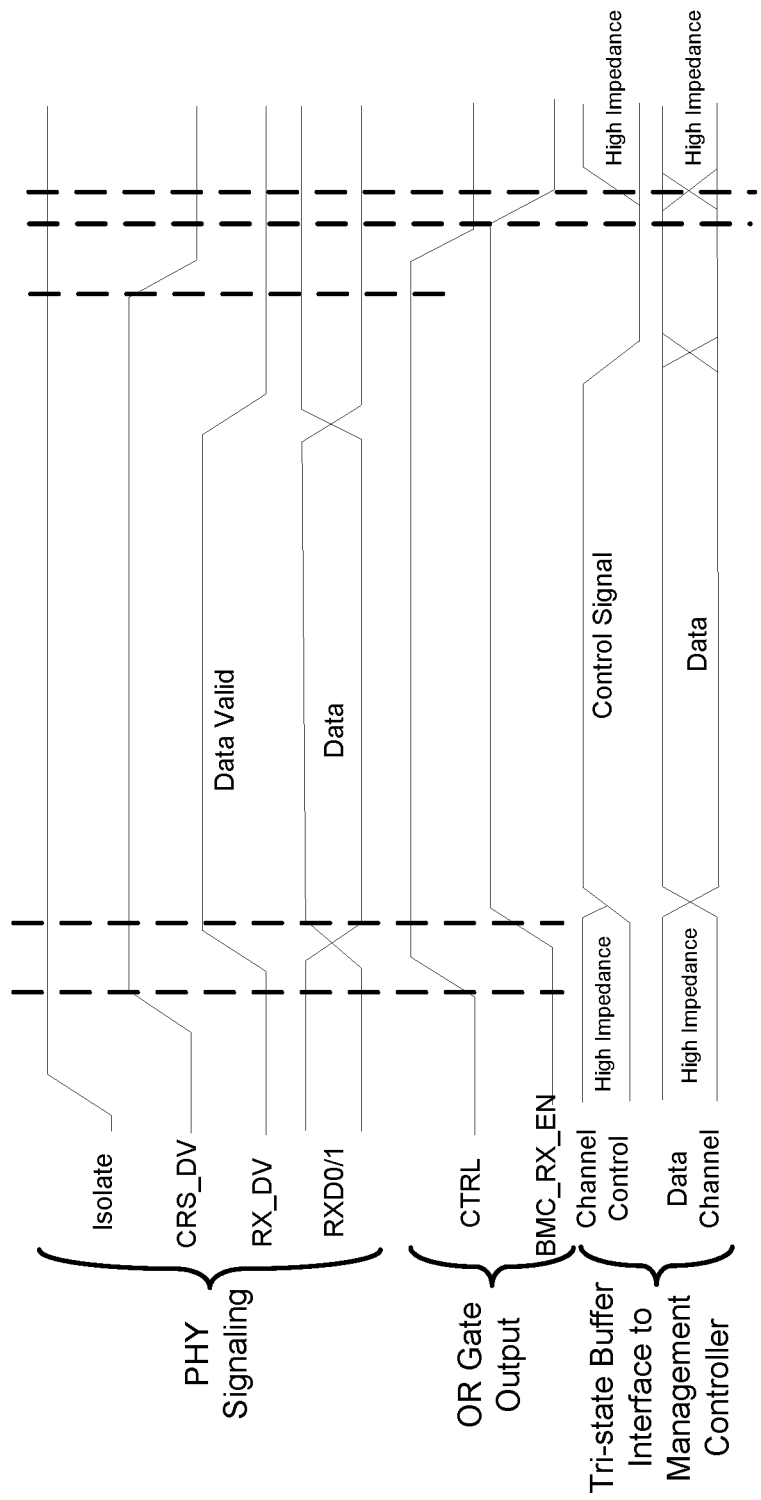
FIG. 2B shows a signaling diagram illustrating signaling of a sideband communication system in accordance with an embodiment.
Figure 2C:
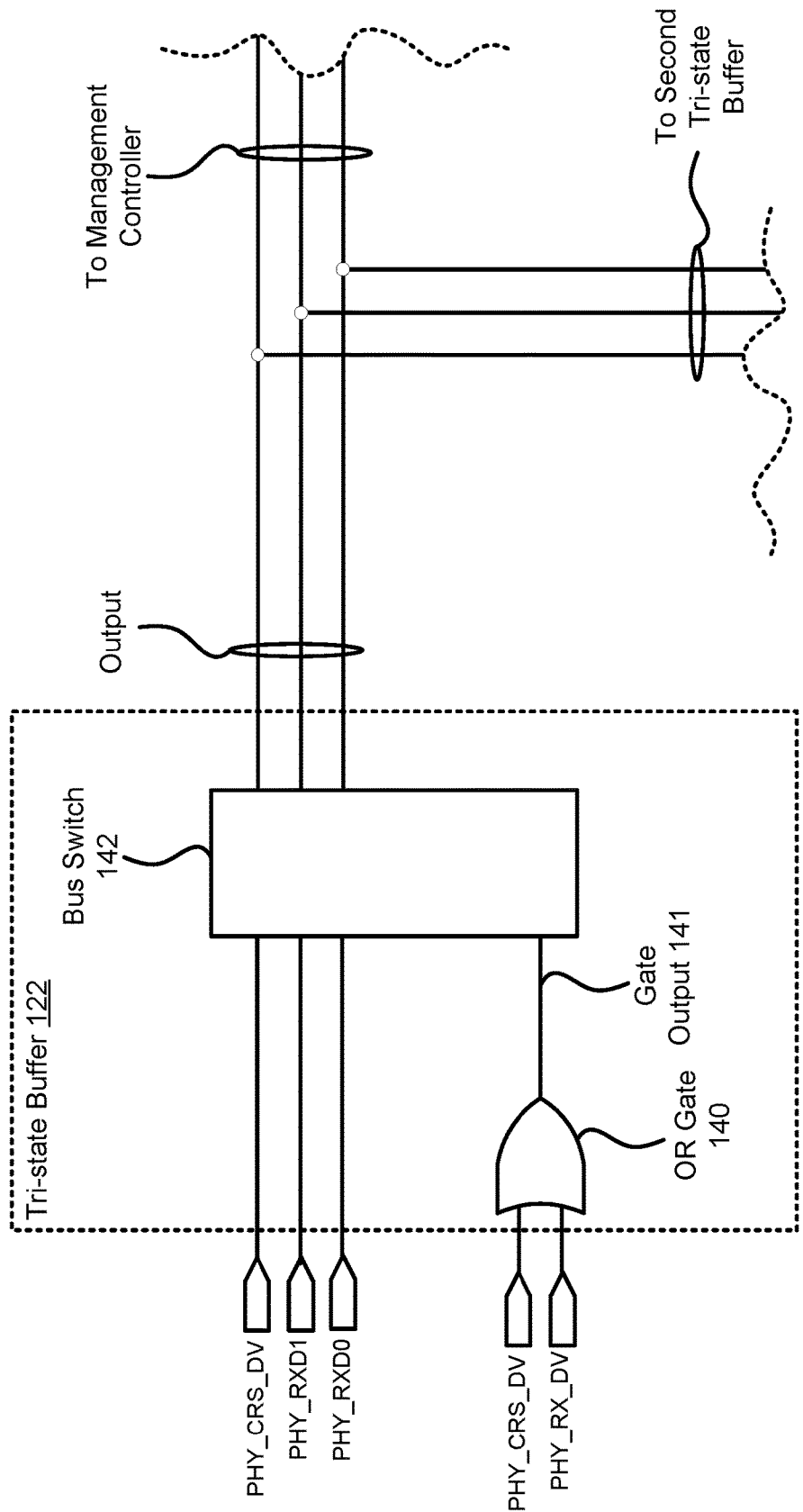
FIG. 2C shows a block diagram illustrating a buffer in accordance with an embodiment.
Figure 3:
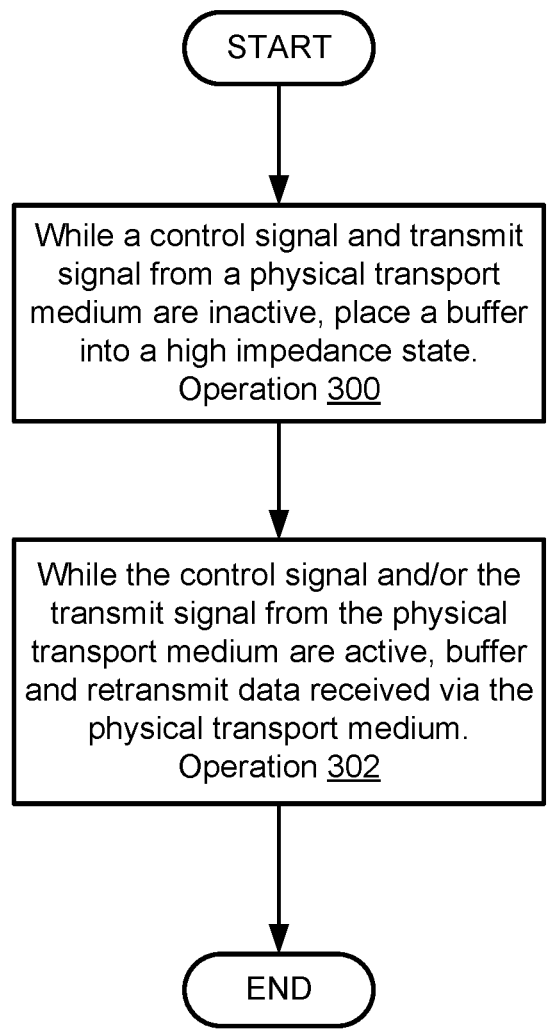
FIG. 3 shows a flow diagram illustrating a method of performing sideband communications in accordance with an embodiment.

When providing their respective functionality, any of data processing systems 10 may perform all, or a portion, of the method illustrated in FIG. 3. Refer to FIGS. 1B-2C for additional details regarding data processing systems 10.

Any of data processing systems 10 and data sources 15 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with a communication system 11. In an embodiment, communication system 11 includes one or more networks that facilitate communication between any number of components. The networks may include wired networks and/or wireless networks (e.g., and/or the Internet). The networks may operate in accordance with any number and types of communication protocols (e.g., such as the internet protocol).

As noted above, the system of FIG. 1A may also include data sources 15. Data sources 15 may provide data usable to manage the operation of one or more of data processing systems 10. The data may include, for example, instructions with respect to operation that hosted management controllers are to perform, software images, configuration settings, policies, and/or any other types of data usable to manage the operation of data processing systems 10. In an embodiment, data sources 15 and the hosted management controllers are members of a management plane usable to manage data processing systems 10. The management plane may direct, modify, configure, and/or otherwise control the operation of data processing systems 10.

While illustrated in FIG. 1A as including a limited number of specific components, a system in accordance with an embodiment may include fewer, additional, and/or different components than those illustrated therein.

To further clarify embodiments disclosed herein, diagrams of a data processing system and portions thereof in accordance with an embodiment are shown in FIGS. 1B-2A and 2C, respectively.

Figure 1B:
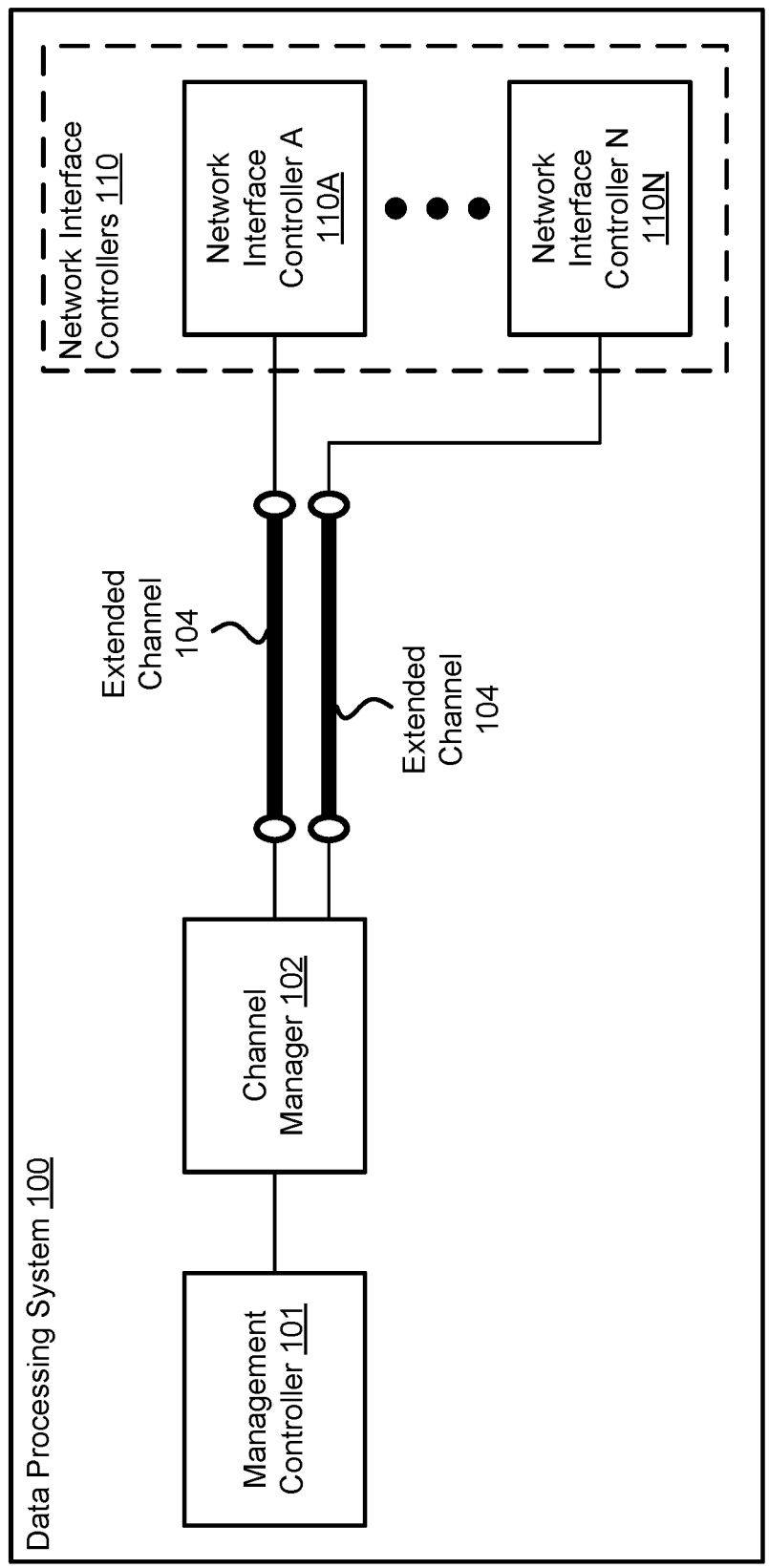
FIG. 1B shows a block diagram illustrating a data processing system in accordance with an embodiment.

Turning to FIG. 1B, a diagram illustrating data processing system 100 in accordance with an embodiment is shown. Data processing system 100 may be similar to any of data processing systems 10. Data processing system 100 may include management controller 101, channel manager 102, any number of extended channels (e.g., 104), any number of network interface controllers 110, and/or other devices (not shown). Each of these components is discussed below.

As noted above, data processing system 100 may be managed, at least in part, by management controller 101. Management controller 101 may be operably connected to one or more other devices via extended channel 104. In FIG. 1B, management controller 101 is illustrated as being connected to network interface controllers 110 via extended channel 104. It will be appreciated that management controller 101 may be operably connected to any number of devices via extended channel 104 without departing from embodiments disclosed herein.

To manage data processing system 100, management controller 101 may communicate with network interface controllers 110 and/or other devices (not shown) via sideband communications. However, in an embodiment, network interface controllers 110 are positioned sufficiently far from management controller 101 so that sideband communication specification compliant communications may not be achieved using signaling and circuitry as specified by the NC-SI specification.

For example, extended channel 104 may be implemented with a set of conductors that carry electrical signals for communication purposes. However, extended channel 104 may be of sufficient length that it exceeds the capabilities of the NC-SI specification (e.g., which may be related to signal timing).

To facilitate communications between management controller 101 and network interface controllers 110 using standard NC-SI specification signaling, data processing system 100 may include (i) channel manager 102 and (ii) an implementation for extended channel 104 that allow for NC-SI specification compliant signaling to be performed. For example, channel manager 102 may provide a tri-state interface for each of the extended channels between network interface controllers 110 and management controller 101. The tristate interfaces for each channel may be operated such that all of the interfaces through which data is not being actively sent present a high impedance at the respective interface thereby electrically isolating them from an extended channel through which data is being sent. By doing so, when data is transmitted, only the interface of the active channel may be electrically active (e.g., each of the interfaces may be capable of presenting a high impedance, logic high signal, and logic low signal at the interface).

Channel manager 102 may also operably connect an interface of management controller 101 to the interfaces for each of the channels presented by channel manager 102. By doing so, management controller 101 may be electrically isolated (e.g., by the high impedance presented by inactive interfaces) from all dormant channels and operably connected to the active channel.

Each extended channel 104 may include a pair of interfaces for transmitting data between channel manager 102 and a corresponding device. Generally, the pairs of interfaces may not include tri-state interface functionality. Consequently, each of extended channels 104 may not be capable of complying with the NC-SI specification with respect to tri-state interfacing for multi-drop (e.g., multiple device) buses. Refer to FIGS. 2A and 2C for additional details regarding channel manager 102 and extended channel 104.

Network interface controllers 110 may provide communication functionality between data processing system 100 and other devices (e.g., data sources 15). Additionally, network interface controllers 110 may each include sideband communication functionality. Generally, sideband communication functionality may include (i) signaling capability in compliance with a sideband communication specification (e.g., NC-SI) and (ii) hardware arbitration functionality to facilitate sharing of a communication bus for sideband communications amongst multiple devices. By doing so, the network interface controllers 110 may independently manage sharing of extended channel 104 but may not include functionality for managing presentation of tri-state interfaces to management controller 101. Refer to FIG. 2A for additional details regarding hardware arbitration to manage use of the channel between management controller 101 and network interface controllers 110.

In an embodiment, one or more of management controller 101, channel manager 102, and network interface controllers 110 is implemented using a hardware device including circuitry. The hardware device may be, for example, a digital signal processor, a field programmable gate array, or an application specific integrated circuit. The circuitry may be adapted to cause the hardware device to perform the functionality of management controller 101, channel manager 102, and/or network interface controllers 110. Management controller 101, channel manager 102, and/or network interface controllers 110 may be implemented using other types of hardware devices without departing embodiment disclosed herein.

In an embodiment, one or more of management controller 101, channel manager 102, and network interface controllers 110 is implemented using a processor adapted to execute computing code stored on a persistent storage that when executed by the processor performs the functionality of management controller 101, channel manager 102, and/or network interface controllers 110 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, management controller 101 is implemented using an independently operating computing device hosted by data processing system 100. The computing device may include functionality to (i) perform independent operations, (ii) control the operation of data processing system 100 and/or portions thereof, (iii) communicate with other devices (e.g., data sources 15) using network interface controllers 110, (iv) implement the NC-SI specification for communicating with network interface controllers 110 and/or other devices, and/or (v) other types of functionalities.

While illustrated in FIG. 1B with a limited number of specific components, a data processing system may include additional, fewer, and/or different components without departing from embodiments disclosed herein.

Turning to FIG. 2A, a diagram illustrating an example sideband communication system in accordance with an embodiment is shown. In FIG. 2A, the sideband communication system is illustrated with two interface controllers (e.g., 110A, 110B). However, it should be understood that the sideband communication system may facilitate sideband communications between any number of devices.

The sideband communication system may be implemented with Ethernet transport portions (e.g., unshared, point to point transport). Each of these transport portions may be used to implement communications compliant with the reduced media interface specification, and may include two physical interfaces (e.g., 112) and a communication channel between the interfaces. The interfaces may be implemented using integrated circuits and the communication channel between the pair of interfaces may be implemented using cabling, circuit card traces, etc. Each of interfaces and communication channel may be an extended channel 104, as described with respect to FIG. 1B. The integrated circuits may lack the ability to tri-state their output and, consequently, may not comply with the NC-SI specification. Additionally, neither of the interfaces may be operably connected to arbitration bus 111, discussed below. Consequently, the electrical signals carried over each of extended channel 104 may not include information regarding which of the network interface controllers has authority to transmit over the shared channel to management controller 101.

The integrated circuits providing the interfaces across the communication medium (e.g., cabling, circuit card traces, etc.) may include both control lines and signal lines. As will be discussed below, embodiments disclosed herein may utilize the signals transmit over the control lines to control the operation of tri-state buffers of channel manager 102. By doing so, embodiments disclosed herein may allow for tri-state interfaces in compliance with the NC-SI specification to be presented to management controller 101. Refer to FIG. 2B for additional details regarding control and signal lines used by channel manager 102 to manage the states of interfaces presented to management controller 101.

To manage communications over extended channel 104, the sideband communication system may also include arbitration bus 111. Arbitration bus 111 may be a communication bus that allows any number of devices that may use the sideband communication system to coordinate authority over the shared communication channel. The devices (e.g., network interface controllers 110A, 110B) may manage which device has authority to communicate using extended channel 104 at different points in time using any technique without departing from embodiments disclosed herein. In an embodiment, the management technique implemented by the network interface controllers (and/or other devices) ensures that only one device has authority to transmit over extended channel 104 at a time.

Channel manager 102 may provide tri-state interfaces to comply with the NC-SI specification. One interface of each of the reduced media independent interface based transport may be operably connected to a tri-state buffer (e.g., 122, 124) of channel manager 102. The tri-state buffer may provide a tri-state interface for each extended channel. The tri-state interfaces may be presented to management controller 101 via management controller connection 126. Refer to FIG. 2C for additional details regarding tri-state buffers.

While illustrated in FIG. 2A with a limited number of specific components, a sideband communication system may include additional, fewer, and/or different components without departing from embodiments disclosed herein.

Turning to FIG. 2B, a signaling diagram of signals transmitted across an extended channel in accordance with an embodiment is shown. In the signaling diagram, signals transmitted across an extended channel and out of an interface are shown in the first for signal lines from the top of the page (e.g., labeled as isolate, CRS_DV, RX_DV, and RXD0/1).

Data may be transmitted via signal lines (e.g., RXD0/1) while control signals may be transmitted over the other signal lines. When authority is passed to a corresponding network interface controller, the controller may transmit communications to the extended channel which may then provide the control signals along with the data included in the first three signal lines (e.g., isolate, CRS_DV, and RX_DV).

The control signal lines may be monitored (e.g., for logic high) and used by channel manager 102 to control the output of the corresponding tri-state buffer. While data is not transmitted, channel manager 102 may keep the tri-state buffer in a high-impedance interface state so that it is electrically isolated from the management controller. However, when either of the control lines CRS_DV or RX_DV go logic high, that may be treated as an indication that data will be transmitted, and the interface presented by the tri-state buffer should no longer be electrically isolated from the management controller. In FIG. 2B, a pair of vertical dashed lines are placed to indicate the period of time when CRS_DV and RX_DV begin to output a logical high signal.

When the logical high signal is output, the management controller may use the output generated by a logical OR gate to transition the operation of the tri-state buffer from presenting a high impedance to bridging signals from the physical signaling to the tri-state buffer interface presented to the management controller. Consequently, data transmitted to the management controller may begin to be presented to the management controller.

For example, as seen in the signaling diagram, after the pair of vertical dashed lines, the control channel, and data channel of the tri-state buffer (lower two signal lines) may (i) terminate the high impedance state and (ii) begin to bridge the data (e.g., RXD0/1) and control signals (e.g., RX_DV) to the interface of the management controller. Once the data is transmitted, the control channel and data channel of the tri-state buffer interface to the management controller may transition back to the high impedance state. This process may be triggered by the OR gate no longer outputting a logical high signal due to the control signals (e.g., CRS_DV and RX_DV) presenting a logical low signal (e.g., as seen in FIG. 2B, this occurs where the second group of vertical lines are located).

Refer to FIG. 2C for additional details regarding the logic gates and circuits used to implement the tri-state buffer.

Turning to FIG. 2C, a diagram illustrating tri-state buffer 122 in accordance with an embodiment is shown. To provide its functionality, tri-state buffer 122 may include OR gate 140 and bus switch 142.

Or gate 140 may be implemented with an integrated circuit that outputs a logic high signal when either input is logic high. In FIG. 2C, signals input to bus switch 142 and OR gate 140 labeled similarly to those shown in FIG. 2B.

Gate output 141 of OR gate 140 may be connected to bus switch 142 via a control pin that controls the states of the pins from bus switch 142 and connected to the management controller. As seen in FIG. 2C, the pins from bus switch 142 may be connected in parallel with at least one other tri-state buffer.

The control pin may control whether the output pins (i) bridge signals from certain pins (e.g., the control/data signals from the extended channel) to the output pins, or (i) present a high impedance to electrically isolate bus switch 142 from the management controller, the second tri-state buffer, and/or any other devices connected in parallel to the management controller. In this topology, the signal from gate output 141 places the output pins in the high impedance state while both control signals are low on the extended channel, and bridge the control/data signals from the extended channel while any of the control signals are logic high indicating that data will begin to be transmitted.

Thus, as shown in FIG. 2C, embodiments disclosed herein may facilitate sideband communications over longer distances by presenting a managed state interface at the end of the communication channel (e.g., that is presented to the management controller).

As discussed above, the components of FIG. 1A may perform various methods to manage communications. FIG. 3 illustrates methods that may be performed by the components of FIGS. 1A-2C. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing performance of sideband communications in accordance with an embodiment is shown. The method may be performed by a data processing system or other components of the system shown in FIG. 1A.

At operation 300, a buffer is placed into a high impedance state while a control signal and a transmit signal from a physical transport medium are inactive (e.g., when control signals are low). The buffer may be placed into the high impedance state using the output of a logic OR gate that presents a logic high output when either of the control signal and transmit signal are logic high. The output of the logic OR gate control the state of the output of the buffer. While the output is logic low, the output of the buffer may be placed in the high impedance state.

The control signal and transmit signal may be part of the physical transport medium, and may not comply with the NC-SI specification. For example, the control signal and transmit signal may only comply with point-to-point communication standards (e.g., RMII specification). Consequently, the interfaces presented by the physical transport medium may not comply with the NC-SI specification regarding electrical isolation.

At operation 302, data received via the physical transport medium is buffered and retransmitted to a management controller while the control signal and/or transmit signal are active. For example, the output of the logical OR gate may go logic high while either of these control/transmit signals are logic high thereby modifying the control signal presented to the bus switch. When so modified, the bus switch may begin to bridge data from the transport medium to the output of the bus switch thereby transmitting it to a management controller connected to the output of the bus switch.

The method may end following operation 302.

Using the method illustrated in FIG. 3, embodiments disclosed herein may facilitate sideband communications across distances greater than supported by the NC-SI specification. Thus, embodiments disclosed herein may address the technical problem of limitations on the distances over which communications may be transmitted.

Figure 4:
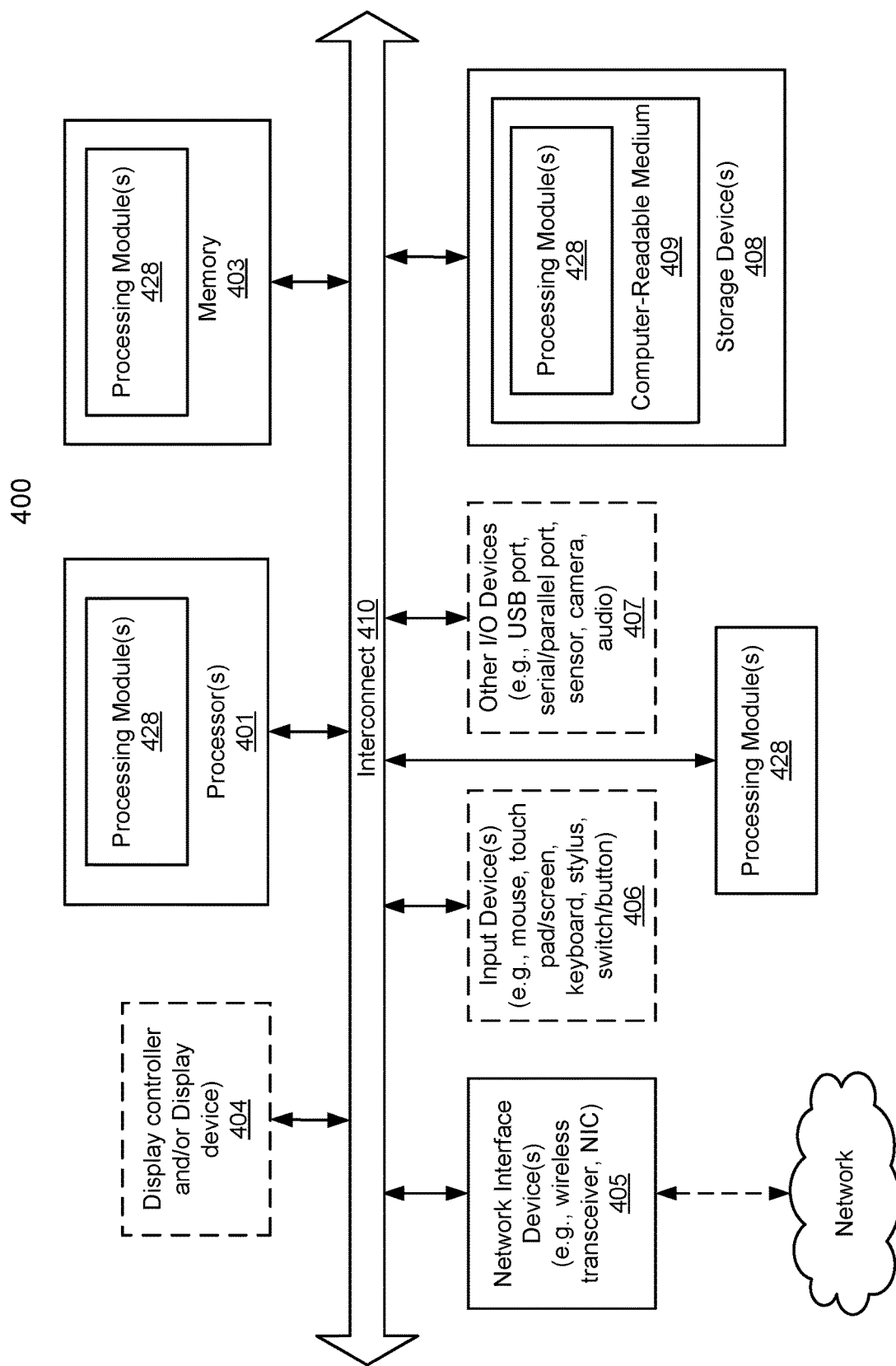
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A data processing system, comprising:
   a management controller adapted to communicate with network interface controllers via sideband communications through a tri-state enabled interface;
   a first network interface controller of the network interface controllers;
   a second network interface controller of the network interface controllers;
   a reduced media interface based transport to carry the sideband communications to the first network interface controller or the second network interface controller across an extended channel that exceeds distance limits of standard Network Controller Sideband Interface (NC-SI) specification signaling associated with the sideband communications, the reduced media interface based transport lacking tri-state interface functionality; and
   a channel manager adapted to communicate with the reduced media interface based transport and present the tri-state enabled interface to the management controller.

2. The data processing system of claim 1, wherein the channel manager comprises:
   a bus switch;
   an OR gate positioned to:
      receive a control signal and a data valid signal from the reduced media interface based transport;
      when at least one of the control signal and the data valid signal are a high signal, output a high signal to the bus switch; and
      when the control signal and the data valid signal are a low signal, output a low signal to the bus switch,
   wherein the bus switch is adapted to, while the high signal from the OR gate is output, transmit data received via the reduced media interface to the management controller.

3. The data processing system of claim 2, wherein the bus switch is further adapted to, while the low signal from the OR gate is output, present a high impedance on electrical lines interconnecting the bus switch and to the management controller, the high impedance providing electrical isolation while the bus switch is not transmitting to the management controller.

4. The data processing system of claim 3, wherein the channel manager comprises a second bus switch, and output of the bus switch and the second bus switch are both electrically connected to the management controller to support the sideband communications.

5. The data processing system of claim 1, further comprising:
an arbitration bus operably connected to the first network interface controller and the second network interface controller, wherein the first network interface controller and the second network interface controller are adapted to communicate via the arbitration bus to limit communication over the reduced media interface based transport to one network interface controller at a time.

6. The data processing system of claim 5, wherein the channel manager is unable to access the communications via the arbitration bus to identify which of the network interface controllers has authority to communicate via the reduced media interface based transport.

7. The data processing system of claim 1, wherein the management controller provides out of band management functionality for computing resources of the data processing system.

8. The data processing system of claim 7, wherein the management controller is adapted to leverage the network interface controllers to communicate with a remote control plane tasked with managing the computing resources of the data processing system.

9. The data processing system of claim 8, wherein the management controller is adapted to obtain updates for operation of the data processing system via the sideband communication with the network interface controllers, and deploy the updates to the computing resources.

10. The data processing system of claim 9, wherein deploying the updates comprises installing an operating system in the computing resources, the operating system being adapted to manage operation of the data processing system, and the management controller operating independently from the operating system.

11. The data processing system of claim 8, wherein the management controller is adapted to report telemetry information regarding the computing resources to the remote control plane via the sideband communications.

12. The data processing system of claim 8, wherein at least one of the network interface controllers is a data processing unit.

13. The data processing system of claim 1, wherein the reduced media interface based transport is shared by the first network interface controller and the second network interface controller using a protocol that is unable to compensate for a length of the extended channel.

14. A communication system, comprising:
a first network interface controller of the network interface controllers;
a second network interface controller of the network interface controllers;
a reduced media interface based transport to carry sideband communications between the first network interface controller or the second network interface controller across an extended channel that exceeds distance limits of standard Network Controller Sideband Interface (NC-SI) specification signaling associated with the sideband communications to a management controller, the reduced media interface based transport lacking tri-state interface functionality adapted to communicate with network interface controllers via sideband communications through a tri-state enabled interface; and
a channel manager adapted to communicate with the reduced media interface based transport and present the tri-state enabled interface to the management controller.

15. The communication system of claim 14, wherein the channel manager comprises:
a bus switch;
an OR gate positioned to:
receive a control signal and a data valid signal from the reduced media interface based transport;
when at least one of the control signal and the data valid signal are a high signal, output a high signal to the bus switch; and
when the control signal and the data valid signal are a low signal, output a low signal to the bus switch,
wherein the bus switch is adapted to, while the high signal from the OR gate is output, transmit data received via the reduced media interface to the management controller.

16. The communication system of claim 15, wherein the bus switch is further adapted to, while the low signal from the OR gate is output, present a high impedance on electrical lines interconnecting the bus switch and to the management controller.

17. The communication system of claim 16, wherein the channel manager comprises a second bus switch, and output of the bus switch and the second bus switch are both electrically connected to the management controller to support the sideband communications.

18. The communication system of claim 14, further comprising:
an arbitration bus operably connected to the first network interface controller and the second network interface controller, wherein the first network interface controller and the second network interface controller are adapted to communicate via the arbitration bus to limit communication over the reduced media interface based transport to one network interface controller at a time.

19. The communication system of claim 18, wherein the channel manager is unable to access the communications via the arbitration bus to identify which of the network interface controllers has authority to communicate via the reduced media interface based transport.

20. The communication system of claim 14, wherein the reduced media interface based transport is shared by the first network interface controller and the second network interface controller using a protocol that is unable to compensate for a length of the extended channel.

* * * * *